(12) United States Patent
Murayama

(10) Patent No.: US 7,379,252 B2
(45) Date of Patent: May 27, 2008

(54) ENDOSCOPE OBJECTIVE LENS SYSTEM

(75) Inventor: Minoru Murayama, Tokyo (JP)

(73) Assignee: PENTAX Corporation, Tokyo (JP)

( * ) Notice: Subject to any disclaimer, the term of this patent is extended or adjusted under 35 U.S.C. 154(b) by 261 days.

(21) Appl. No.: 11/389,123

(22) Filed: Mar. 27, 2006

(65) Prior Publication Data

US 2006/0221457 A1    Oct. 5, 2006

(30) Foreign Application Priority Data

Mar. 30, 2005    (JP) .............................. 2005-099930

(51) Int. Cl.
*G02B 13/04* (2006.01)
*G02B 9/08* (2006.01)

(52) U.S. Cl. ..................... 359/749; 359/740

(58) Field of Classification Search ............... 359/793, 359/784, 749–753, 656–661
See application file for complete search history.

(56) References Cited

U.S. PATENT DOCUMENTS

| | | | |
|---|---|---|---|
| 4,806,001 A | 2/1989 | Okabe et al. | |
| 5,223,982 A | 6/1993 | Suzuki et al. | |
| 5,436,767 A | 7/1995 | Suzuki et al. | |
| 5,619,380 A | 4/1997 | Ogasawara et al. | |
| 5,703,724 A | 12/1997 | Miyano | |
| 5,828,498 A | 10/1998 | Sekiya et al. | |
| 6,163,410 A * | 12/2000 | Nagaoka | 359/654 |
| 6,833,967 B2 * | 12/2004 | Sekita | 359/770 |
| 7,230,775 B2 * | 6/2007 | Kato | 359/745 |

FOREIGN PATENT DOCUMENTS

| | | |
|---|---|---|
| JP | 62-173415 | 7/1987 |
| JP | 5-107470 | 4/1993 |
| JP | 5-341185 | 12/1993 |
| JP | 8-334688 | 12/1996 |
| JP | 10-020189 | 1/1998 |
| JP | 2001-100091 | 4/2001 |
| JP | 2002-228926 | 8/2002 |
| JP | 2002-277734 | 9/2002 |
| JP | 2002-303789 | 10/2002 |
| JP | 2004-117607 | 4/2004 |

OTHER PUBLICATIONS

English Language Abstract of JP 10-020189.
English Language Abstract of JP 2001-100091.
English Language Abstract of JP 2002-228926.
English Language Abstract of JP 2002-277734.
English Language Abstract of JP 2002-303789.
English Language Abstract of JP 2004-117607.

* cited by examiner

*Primary Examiner*—Jordan M. Schwartz
(74) *Attorney, Agent, or Firm*—Greenblum & Bernstein, P.L.C.

(57) ABSTRACT

An endoscope objective lens system includes a negative front lens group, a diaphragm, and a positive rear lens group, in this order from the object. The negative front lens group includes one lens element, or a plurality of non-cemented lens elements; and the most object-side lens element is constituted by a negative lens element. The positive rear lens group includes a plurality of non-cemented lens elements; and at least one negative lens element is provided in the positive rear lens group.

8 Claims, 8 Drawing Sheets

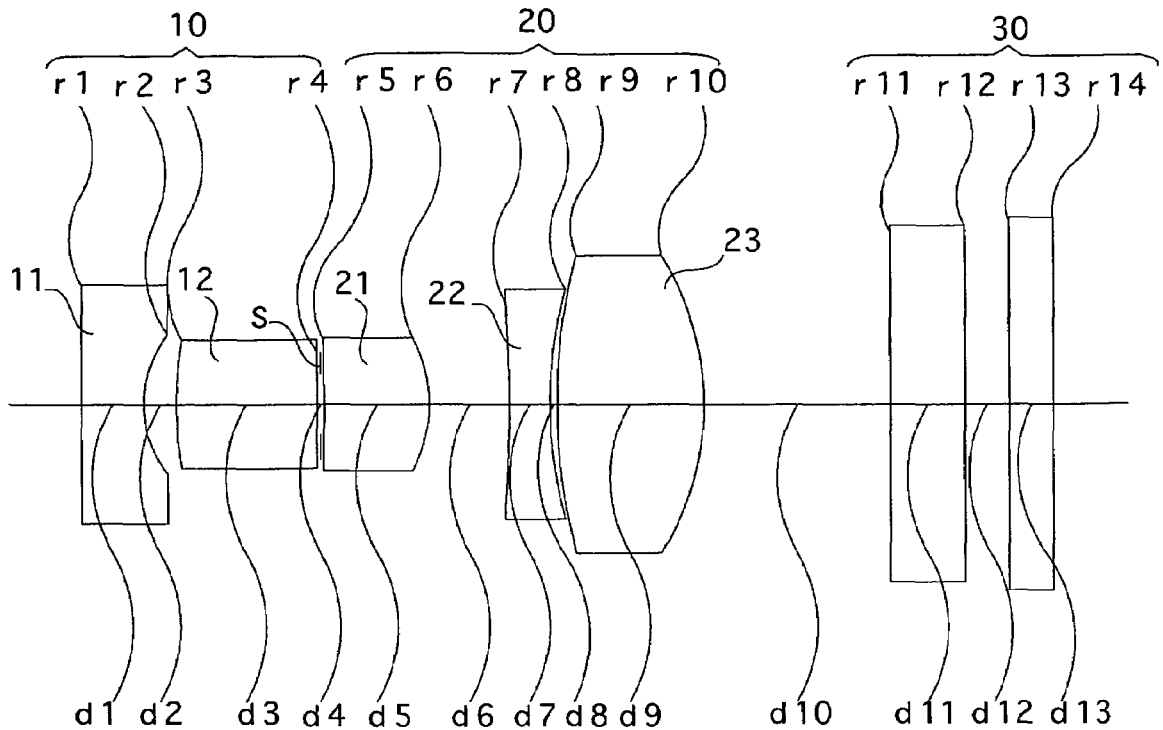
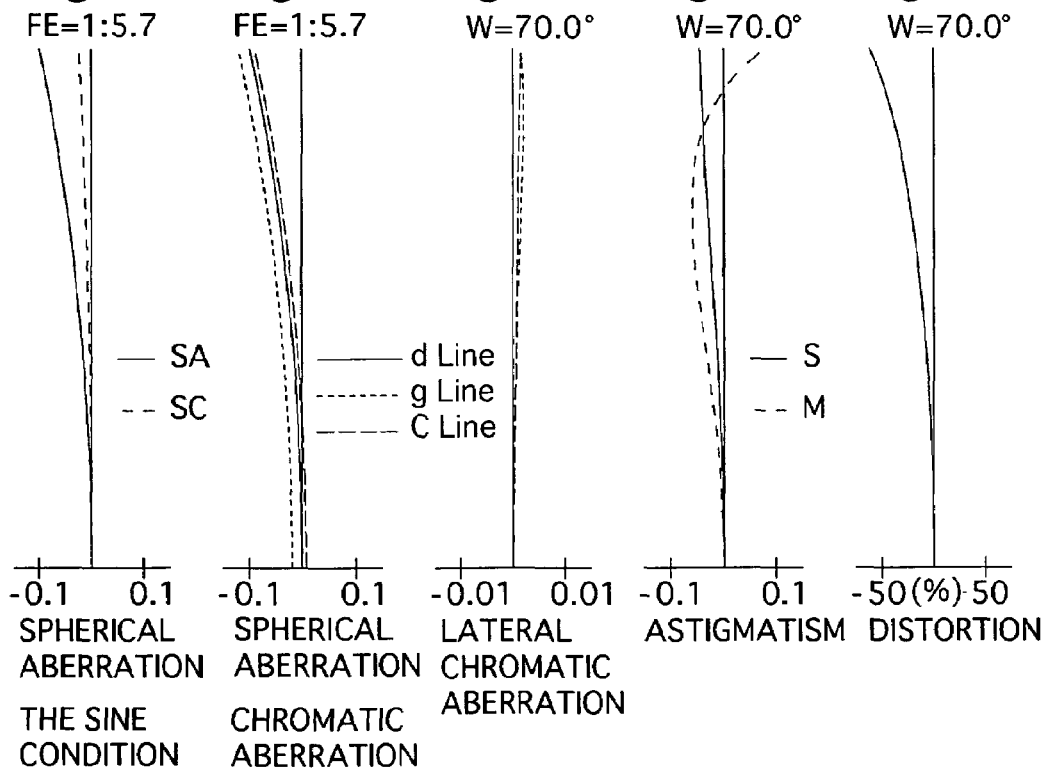

Fig. 5
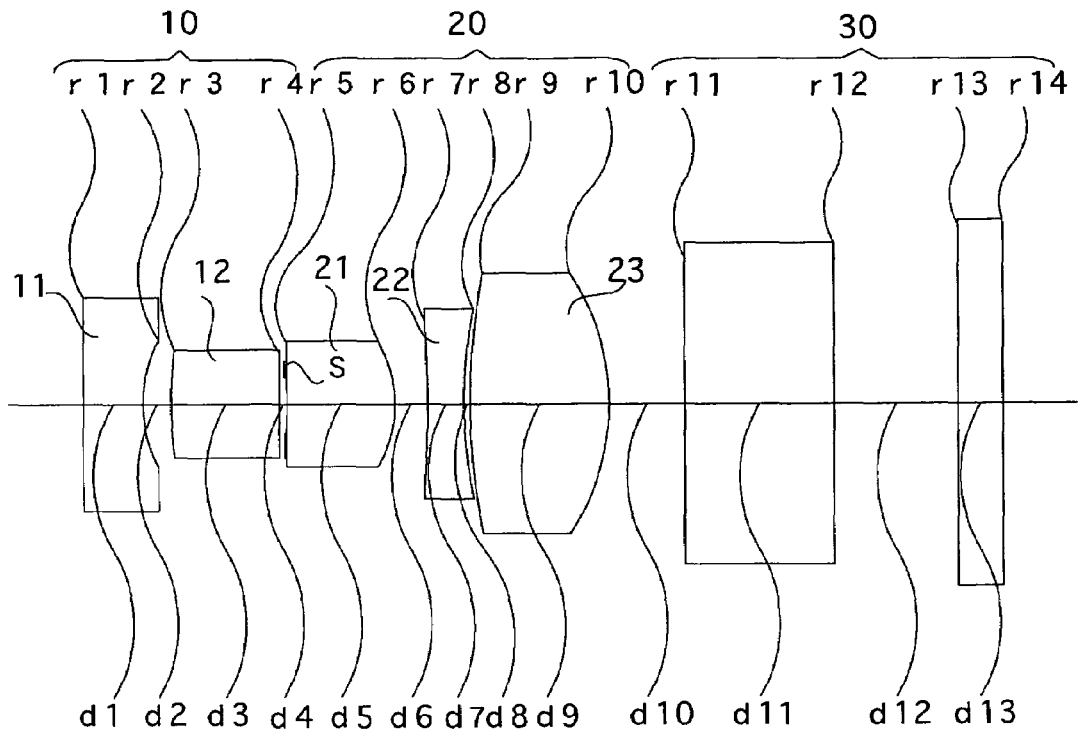
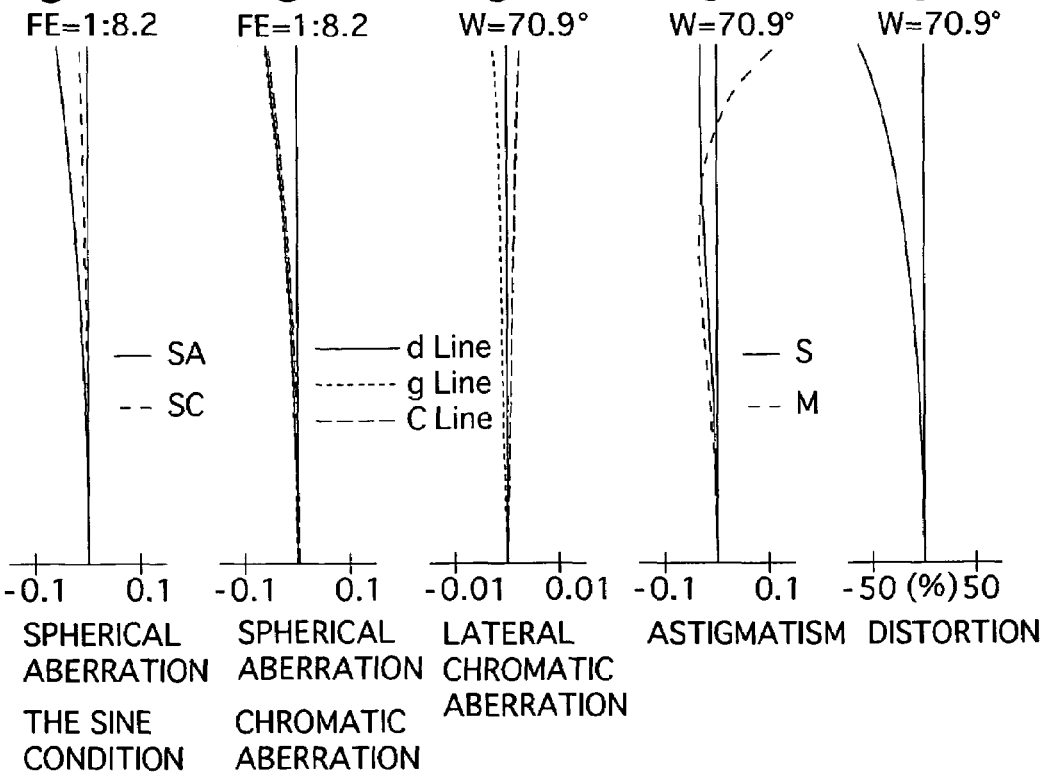
Fig. 6A  Fig. 6B  Fig. 6C  Fig. 6D  Fig. 6E

Fig.7
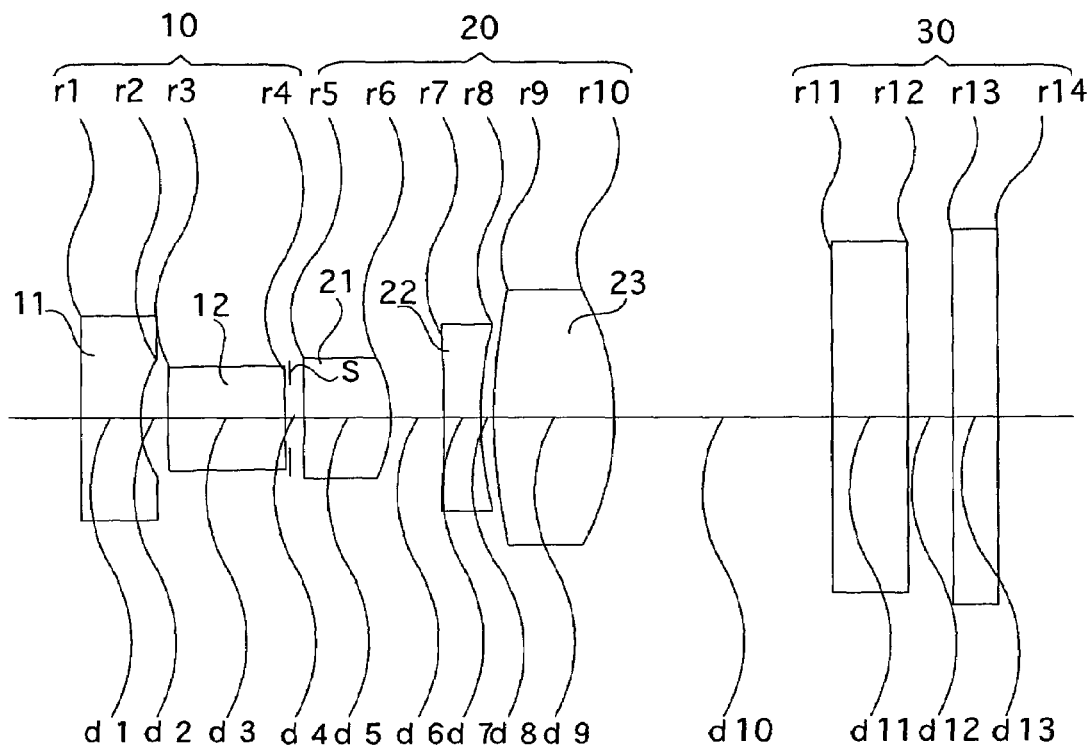
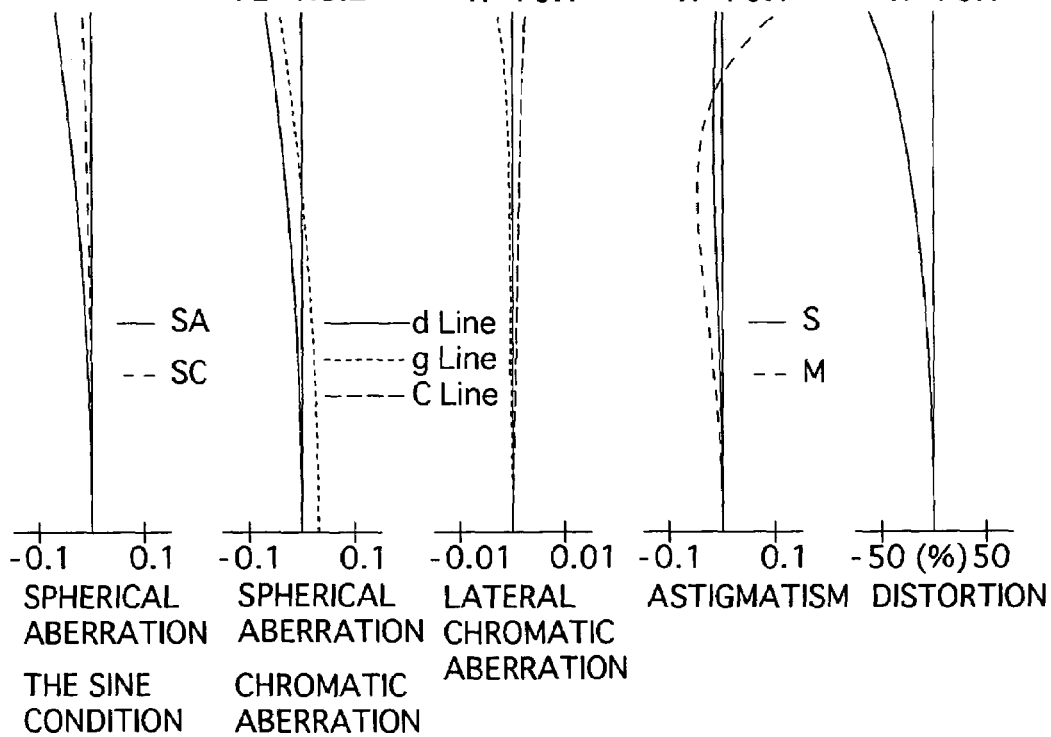
Fig.8A FE=1:8.2 — SA -- SC -0.1 0.1 SPHERICAL ABERRATION THE SINE CONDITION
Fig.8B FE=1:8.2 — d Line ---- g Line ----- C Line -0.1 0.1 SPHERICAL ABERRATION CHROMATIC ABERRATION
Fig.8C W=70.1° -0.01 0.01 LATERAL CHROMATIC ABERRATION
Fig.8D W=70.1° — S -- M -0.1 0.1 ASTIGMATISM
Fig.8E W=70.1° -50 (%) 50 DISTORTION

Fig.15
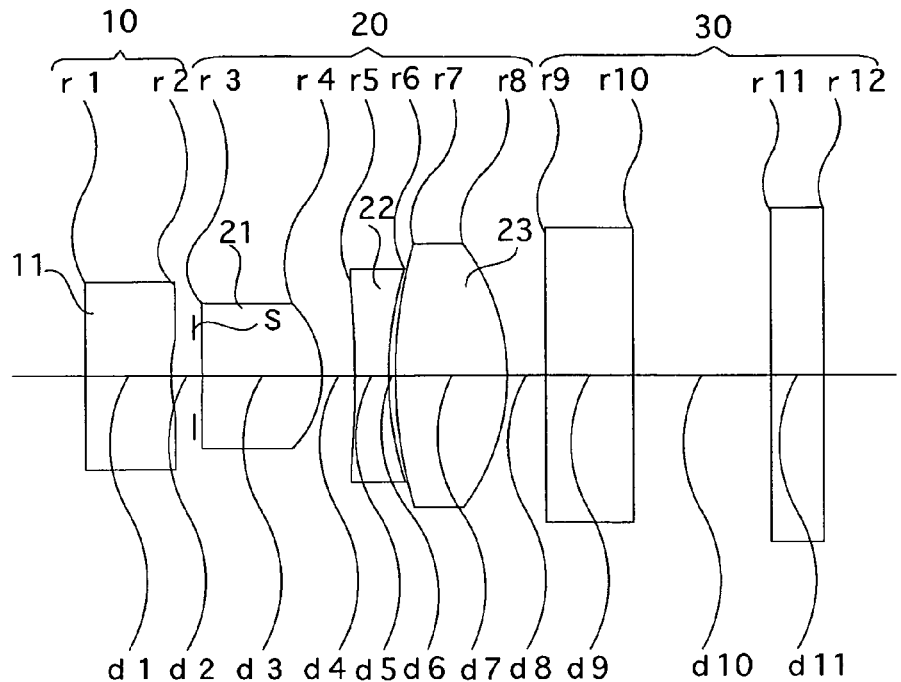
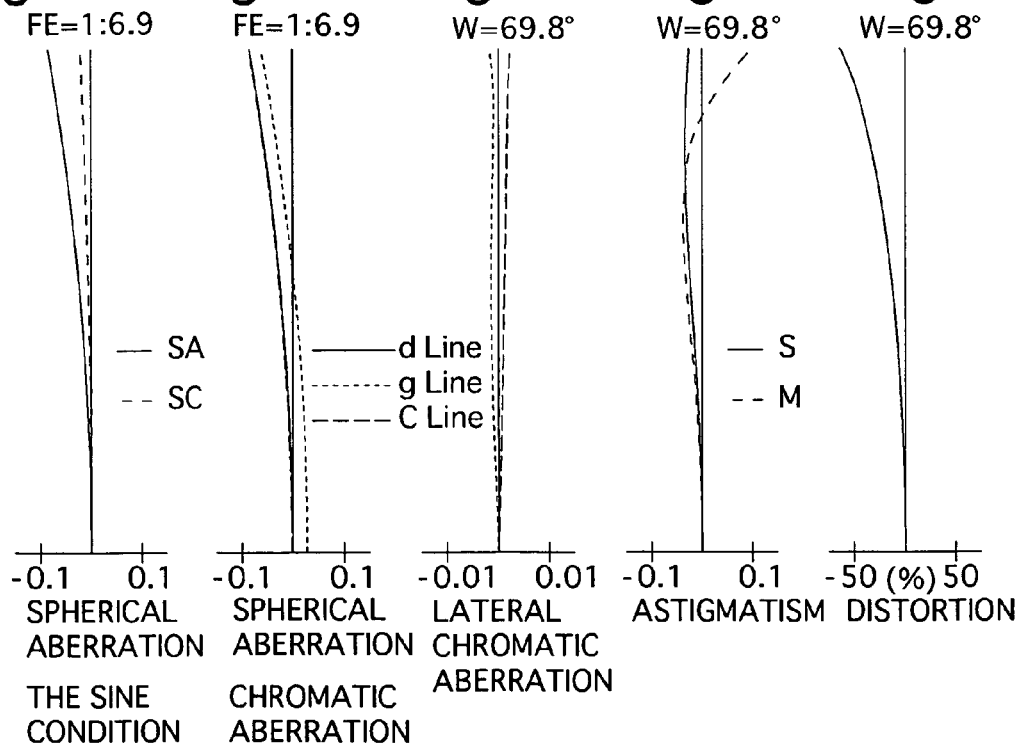
Fig.16A FE=1:6.9 — SA, -- SC — SPHERICAL ABERRATION THE SINE CONDITION
Fig.16B FE=1:6.9 — d Line, ---- g Line, ---- C Line — SPHERICAL ABERRATION CHROMATIC ABERRATION
Fig.16C W=69.8° — LATERAL CHROMATIC ABERRATION
Fig.16D W=69.8° — S, -- M — ASTIGMATISM
Fig.16E W=69.8° — DISTORTION

ENDOSCOPE OBJECTIVE LENS SYSTEM

BACKGROUND OF THE INVENTION

1. Field of the Invention

The present invention relates to an endoscope objective lens system.

2. Description of the Prior Art

In a conventional endoscope objective lens system, the lens elements thereof are often cemented (hereinafter, cemented lens elements) in order to correct aberrations. However, such cemented lens elements have been costly to manufacture, because centering among very small lens elements has to be done precisely, and thereafter, cementing such small lens elements is further required.

In addition to the above, for the purpose of sterilizing an endoscope, high-pressure steam sterilization (an autoclave) has been frequently used. However, due to steam and a high temperature for sterilization, the layer of cementing agent often comes off, or, the quality of bonding agent deteriorates. Consequently, the image quality of the endoscope becomes worse.

To eliminate such a drawback as mentioned above, an endoscope objective lens system without cemented lens elements has been proposed.

(i) Japanese Unexamined Patent Publication (JUPP) No. H05-341185 has disclosed an endoscope objective lens system constituted by two single lens elements; and (ii) JUPP No. H05-107470 has disclosed an endoscope objective lens system constituted by three single lens elements.

However, in the above publications (i) and (ii), the correcting of lateral chromatic aberration, that of axial chromatic aberration, and that of field curvature are insufficient; and telecentricity is inadequate.

(iii) JUPP No. H08-334688 has disclosed an endoscope objective lens system which is constituted by four lens elements and achieves a longer back focal distance. However, a first lens element is the only lens element having a negative refractive power (hereinafter, a negative lens element), so that lateral chromatic aberration is undercorrected, and telecentricity becomes worse.

(iv) JUPP No. 2002-228926 has disclosed an endoscope objective lens system which is constituted by four lens elements divided into a front lens group and a rear lens group, and a negative lens element is provided in each of the front and rear lens groups, respectively.

However, the refractive power of the negative lens element of the front lens group is weaker, and the back focal distance is shorter. Moreover, the refractive power of the negative lens element of the rear lens group is also weaker, and the correcting of lateral chromatic aberration is insufficient.

(v) JUPP No. S62-173415 has disclosed an endoscope objective lens system in which the refractive power of a negative lens element of a positive rear lens group is weaker. Consequently, the correcting of lateral chromatic aberration is insufficient.

(vi) JUPP No. H10-20189 has disclosed an endoscope objective lens system constituted by three or four lens elements divided into a front lens group and a rear lens group. However, the rear lens group is constituted by one or two lens elements, so that lateral chromatic aberration largely occurs, and telecentricity becomes worse. While a rear lens group constituted by three or four lens elements has been proposed, the refractive power of a negative lens element of the rear lens group is stronger, and telecentricity becomes worse. Moreover, due to decentration caused by a gap between a lens element and a lens frame upon being assembled, decentration sensitivity (i.e., how much aberrations occur depending on decentration) becomes higher.

(vii) JUPP No. 2004-117607 has disclosed an endoscope objective lens system in which the negative refractive power of a first lens group is stronger than the refractive power of second and third lens groups. Here, with respect to the diaphragm, the first lens group (on the object-side of the diaphragm) can be defined as a front lens group, and the second and third lens groups (on the image-side of the diaphragm) can be defined as a rear lens group. Consequently, telecentricity becomes worse. Moreover, since the radius of curvature of a negative lens element of the rear lens group is smaller, aberrations of higher order occur. Still further, production costs of an endoscope objective lens system becomes higher, since an aspherical lens surface is employed.

As an example of an objective lens system in which cemented lens elements are not employed, an objective lens system of a digital camera, and that of a video camera are known, as disclosed in JUPP No. 2002-303789, JUPP No. 2001-100091, and JUPP No. 2002-277734. However, in the objective lens system disclosed in each of the publications, the negative refractive power of the first lens element (group) is weaker, so that the angle of view thereof is narrower than that of an endoscope objective lens system.

In regard to aberrations, an endoscope objective lens system, particularly, for an electronic endoscope is required to correct lateral chromatic aberration more appropriately than an endoscope objective lens system for a fiber scope does, because of higher pixelation of an imaging device in recent years. Furthermore, a longer back focal distance needs to be secured for positioning a filter group and a cover glass. Still further, in order to prevent shading in the peripheral area of an imaging device, telecentricity of an endoscope objective lens system needs to be improved.

SUMMARY OF THE INVENTION

The present invention is to provide an endoscope objective lens system which has the following features in order to meet higher pixelation of an imaging device:

(i) no cemented lens elements are provided;

(ii) the angle of view is approximately 140 degrees;

(iii) aberrations are suitably corrected without utilizing aspherical surfaces;

(iv) a longer back focal distance is secured; and (v) telecentricity is improved.

According to an aspect of the present invention, there is provided an endoscope objective lens system including a front lens group having a negative refractive power (hereinafter, a negative front lens group), a diaphragm, and a rear lens group having a positive refractive power (hereinafter, a positive rear lens group), in this order from the object.

The negative front lens group includes one lens element, or a plurality of non-cemented lens elements; and the most object-side lens element is constituted by a negative lens element.

The positive rear lens group includes a plurality of non-cemented lens elements; and at least one negative lens element is provided in the positive rear lens group.

The endoscope objective lens system of the present invention satisfies the following conditions:

$$-1.45 < f_1/f < -0.6 \quad (1)$$

$$0.7 < |f_F/f_R| < 1.35 \quad (2)$$

$$-2.3 < f_{(-)}/f < -1.5 \quad (3)$$

wherein $f_1$ designates the focal length of the most object-side negative lens element of the negative front lens group;

f designates the focal length of the entire endoscope objective lens system;

$f_F$ designates the focal length of the negative front lens group ($f_F < 0$);

$f_R$ designates the focal length of the positive rear lens group ($f_R > 0$); and $f_{(-)}$ designates the focal length of the negative lens element of the positive rear lens group.

The negative lens element of the positive rear lens group preferably satisfies the following condition:

$$1.8 < n_{(-)} \quad (4)$$

wherein $n_{(-)}$ designates the refractive index of the negative lens element of the positive rear lens group.

The positive rear lens group preferably includes two positive lens elements and one negative lens element.

The arrangement of the above lens elements is preferably a positive lens element, a negative lens element and a positive lens element, in this order from the object; and the negative lens element preferably can satisfy the following condition:

$$1.95 < |R_{(-)}|/f < 3 \quad (5)$$

wherein $R_{(-)}$ designates a smaller radius of curvature of one of the surfaces of the negative lens element of the positive rear lens group.

The negative front lens group can include a negative lens element and a positive lens element, in this order from the object. The image-side surface of the positive lens element is preferably formed in a flat surface; and the positive lens element preferably satisfies the following condition:

$$1.6 < f_2/f < 7 \quad (6)$$

wherein f2 designates the focal length of the positive lens element of the negative front lens group.

In addition to the above arrangement, the negative front lens group can include a negative lens element and a plane-parallel plate, in this order from the object, or a single negative lens element.

The present disclosure relates to subject matter contained in Japanese Patent Application No. 2005-99930 (filed on Mar. 30, 2005) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the endoscope objective lens system according to a first embodiment of the present invention;

FIGS. 2A, 2B, 2C, 2D and 2E show aberrations occurred in the lens arrangement shown in FIG. 1;

FIG. 5 is a lens arrangement of the endoscope objective lens system according to a third embodiment of the present invention;

FIGS. 6A, 6B, 6C, 6D and 6E show aberrations occurred in the lens arrangement shown in FIG. 5;

FIG. 7 is a lens arrangement of the endoscope objective lens system according to a fourth embodiment of the present invention;

FIGS. 8A, 8B, 8C, 8D and 8E show aberrations occurred in the lens arrangement shown in FIG. 7;

FIG. 15 is a lens arrangement of the endoscope objective lens system according to an eighth embodiment of the present invention; and FIGS. 16A, 16B, 16C, 16D and 16E show aberrations occurred in the lens arrangement shown in FIG. 15.

DESCRIPTION OF THE PREFERRED EMBODIMENTS

Figure 3:
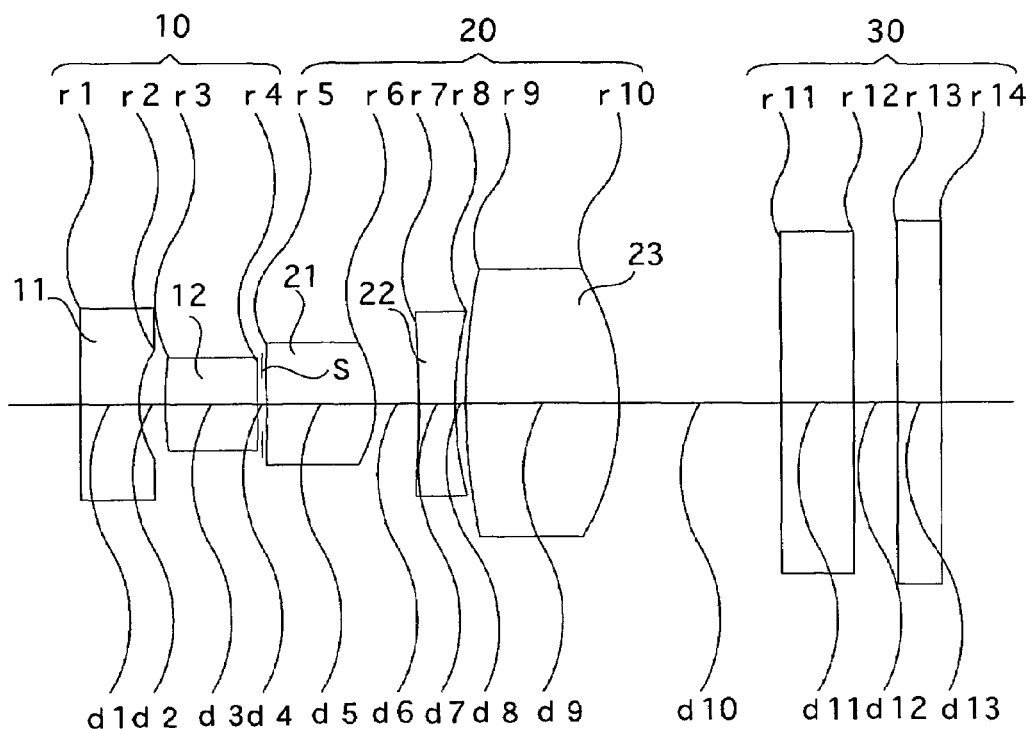
FIG. 3 is a lens arrangement of the endoscope objective lens system according to a second embodiment of the present invention.

The endoscope objective lens system of the present invention, as shown in each lens arrangement of FIGS. 1, 3, 5, 7, 9, 11, 13 and 15, includes a negative front lens group 10, a diaphragm S, and a positive rear lens group 20, in this order from the object.

The negative front lens group 10, in the first to fifth embodiments (FIGS. 1, 3, 5, 7 and 9), includes a negative lens element 11 and a positive lens element 12, in this order from the object.

The negative front lens group 10, in the sixth and seventh embodiments (FIGS. 11 and 13), includes a negative lens element 11 and a plane-parallel plate 12, in this order from the object.

The negative front lens group 10, in the eighth embodiment (FIG. 15), includes a single negative lens element 11.

Throughout all the embodiments, the positive rear lens group 20 includes a positive lens element 21, a negative lens element 22, and a biconvex positive lens element 23, in this order from the object; and a filter group (plane-parallel plates) 30 which is positioned just in front of an imaging surface of a solid-state imaging device is provided on the image-side of the positive rear lens group 20.

Condition (1) specifies the focal length of the most object-side negative lens element 11 of the negative front lens group 10.

If $f_1/f$ exceeds the upper limit of condition (1), the negative refractive power of the most object-side negative lens element 11 becomes too strong, and field curvature is overcorrected. With regard to the first to fifth embodiments, when the negative refractive power of the most object-side negative lens element 11 becomes too strong, the positive refractive power of the positive lens element 12 becomes stronger accordingly. Consequently, coma and astigmatism occurred in the positive lens element 12 become larger.

If $f_1/f$ exceeds the lower limit of condition (1), the negative refractive power of the most object-side negative lens element 11 becomes weaker, so that a sufficiently wide angle-of-view cannot be obtained. Furthermore, field curvature largely occurs.

Condition (2) concerns the ratio of the refractive power of the negative front lens group 10 to that of the positive rear lens group 20. By satisfying this condition, adequate telecentricity is secured, while an increase in the overall length of the endoscope objective lens system is prevented; and the correcting of aberrations is performed suitably.

If $|f_F/f_R|$ exceeds the upper limit of condition (2), the negative refractive power of the negative front lens group 10 becomes weaker, so that the back focal distance becomes shorter. Furthermore, the incident angle of light rays to be incident on the positive rear lens group 20 becomes larger, so that the height of off-axis light rays in the positive rear lens group 20 becomes higher. Consequently, coma and astigmatism largely occur.

If $|f_F/f_R|$ exceeds the lower limit of condition (2), the negative refractive power of the negative front lens group 10 become stronger, so that the incident angle of off-axis light rays to be incident on the positive rear lens group 20 becomes smaller. Consequently, telecentricity cannot be secured, while an increase in the overall length of the endoscope objective lens system is prevented. Moreover, the radius of curvature of the negative lens element of the negative front lens group 10 becomes smaller, so that coma largely occurs. Still further, the height of off-axis light rays in the positive rear lens group 20 becomes lower, and the radius of curvature of the negative lens element of the positive rear lens group 20, for the purpose of correcting aberrations, becomes smaller. Consequently, astigmatism of higher order occurs.

Condition (3) concerns the focal length of the negative lens element 22 of the positive rear lens group 20.

If $f_{(-)}/f$ exceeds the upper limit of condition (3), the negative refractive power of the negative lens element 22 of the positive rear lens group 20 becomes stronger; and the positive refractive power of the positive lens elements (21, 23) of the positive rear lens group 20 becomes stronger accordingly. Consequently, coma and astigmatism occurred in the positive lens elements (21, 23) of the positive rear lens group 20 become larger. Moreover, due to decentration caused by a gap between a lens element and a lens frame upon being assembled, decentration sensitivity (i.e., how much aberrations occur depending on decentration) becomes higher.

If $f_{(-)}/f$ exceeds the lower limit of condition (3), lateral chromatic aberration and field curvature are undercorrected.

Condition (4) concerns the refractive index of the negative lens element 22 of the positive rear lens group 20.

If $n_{(-)}$ exceeds the lower limit of condition (4), the value of the refractive index becomes smaller, so that the radius of curvature of the negative lens element 22 of the positive rear lens group 20 becomes smaller. Consequently, decentration sensitivity (i.e., how much aberrations occur depending on decentration) becomes higher. Moreover, coma and astigmatism of higher order occur.

In order to correct aberrations with the minimum number of lens elements, and to improve telecentricity, the positive rear lens group 20 preferably includes two positive lens elements (21, 23) and one negative lens element 21. Furthermore, in order to effectively perform the correcting of aberrations with the negative lens element 22 of the positive rear lens group 20, it is desirable to arrange the positive lens element 21, the negative lens element 22, and the positive lens element 23, in this order from the object.

For example, in the case where the negative lens element 22 is at the most object-side of the positive rear lens group 20 (i.e., the arrangement of the negative lens element 22, the positive lens element 21 and the positive arrangement 23, in this order from the object), the negative lens element 22 is positioned very close to the diaphragm S which is, as explained, positioned between the negative front lens group 10 and the positive rear lens group 20. Accordingly, off-axis light rays run closer to the optical axis of the negative lens element 22. As a result, aberrations caused by the off-axis light rays are undercorrected.

On the other hand, in the case where the negative lens element 22 is at the most image-side of the positive rear lens group 20 (i.e., the arrangement of the positive lens element 21, the positive lens element 23 and the negative lens element 22, in this order from the object), the negative refractive power of the image-side surface of the negative lens element 22 cannot be made stronger in order to attain telecentricity. Consequently, the negative refractive power of the object-side surface of the negative lens element 22 becomes stronger; and aberrations of higher order occur. Moreover, decentration sensitivity (i.e., how much aberrations occur depending on decentration) becomes higher.

Condition (5) concerns a smaller radius of curvature of one of the surfaces of the negative lens element 22 of the positive rear lens group 20 when the positive rear lens group 20 includes the positive lens element 21, the negative lens element 22 and the positive lens element 23, in this order from the object.

If $|R_{(-)}|/f$ exceeds the upper limit of condition (5), field curvature and lateral chromatic aberration occurred in the negative lens element 22 of the positive rear lens group 20 are undercorrected.

If $|R_{(-)}|/f$ exceeds the lower limit of condition (5), the smaller radius of curvature of one of the surfaces of the negative lens element 22 of the positive rear lens group 20 becomes much more smaller, so that coma and astigmatism of higher order occur. Moreover, decentration sensitivity (i.e., how much aberrations occur depending on decentration) becomes higher.

In the case of the first to fifth embodiment where the negative front lens group 10 includes the negative lens element 11 and the positive lens element 12, in this order from the object, the correcting of distortion and that of lateral chromatic aberration can be done more adequately. In this case, if an attempt is made to form the image-side surface of the positive lens element 12 in a flat surface, a spacer to be positioned between the positive lens element 12 and the diaphragm S can be eliminated. Consequently, fluctuation on optical performance can be reduced, and manufacturing costs can also be advantageously reduced. Due to the above reasons, the positive lens element 12 of the negative front lens group 10 preferably satisfies condition (6).

If $f_2/f$ exceeds the upper limit of condition (6), the effect on the correcting of distortion and lateral chromatic aberration becomes smaller.

If $f_2/f$ exceeds the lower limit of condition (6), the positive refractive power of the positive lens element 12 becomes too strong, so that coma largely occurs.

Specific numerical data of the embodiments will be described hereinafter.

In the diagrams of spherical aberration and the sine condition, SA designates spherical aberration, and SC designates the sine condition.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

The tables, FE designates the effective f-number, f designates the focal length of the entire endoscope objective lens system, m designates the lateral magnification, W designates the half angle-of-view (°), fB designates the back focal distance, r designates the radius of curvature, d designates the lens-element thickness or distance between lens elements, $N_d$ designates the refractive index of the d-line, and ν designates the Abbe number.

Embodiment 1

FIG. 1 is the lens arrangement of the endoscope objective lens system according to the first embodiment of the present invention. FIGS. 2A through 2E show aberrations occurred in the lens arrangement shown in FIG. 1. Table 1 shows the numerical data of the first embodiment.

The negative front lens group 10 includes the negative lens element 11 and the positive lens element 12, in this order from the object.

The positive rear lens group 20 includes the positive lens element 21, the biconcave negative lens element 22, and the biconvex positive lens element 23, in this order from the object.

The diaphragm S is provided 0.027 behind the negative front lens group 10 (surface No. 4).

TABLE 1

FE = 1:5.7
f = 1.20
m = −0.115
W = 70.0
fB = 0.05

| Surf. No. | r | d | Nd | ν |
|---|---|---|---|---|
| 1 | ∞ | 0.417 | 1.88300 | 40.8 |
| 2 | 0.769 | 0.218 | — | — |
| 3 | 2.564 | 0.925 | 1.92286 | 18.9 |
| 4 | ∞ | 0.054 | — | — |
| 5 | −3.192 | 0.689 | 1.77250 | 49.6 |
| 6 | −0.981 | 0.535 | — | — |
| 7 | −9.790 | 0.272 | 1.92286 | 18.9 |
| 8 | 2.866 | 0.049 | — | — |
| 9 | 3.886 | 0.980 | 1.80400 | 46.6 |
| 10 | −1.956 | 1.233 | — | — |
| 11 | ∞ | 0.500 | 1.51633 | 64.1 |
| 12 | ∞ | 0.300 | — | — |
| 13 | ∞ | 0.300 | 1.53113 | 62.4 |
| 14 | ∞ | — | — | — |

Embodiment 2

Figures 4A, 4B, 4C, 4D, 4E:
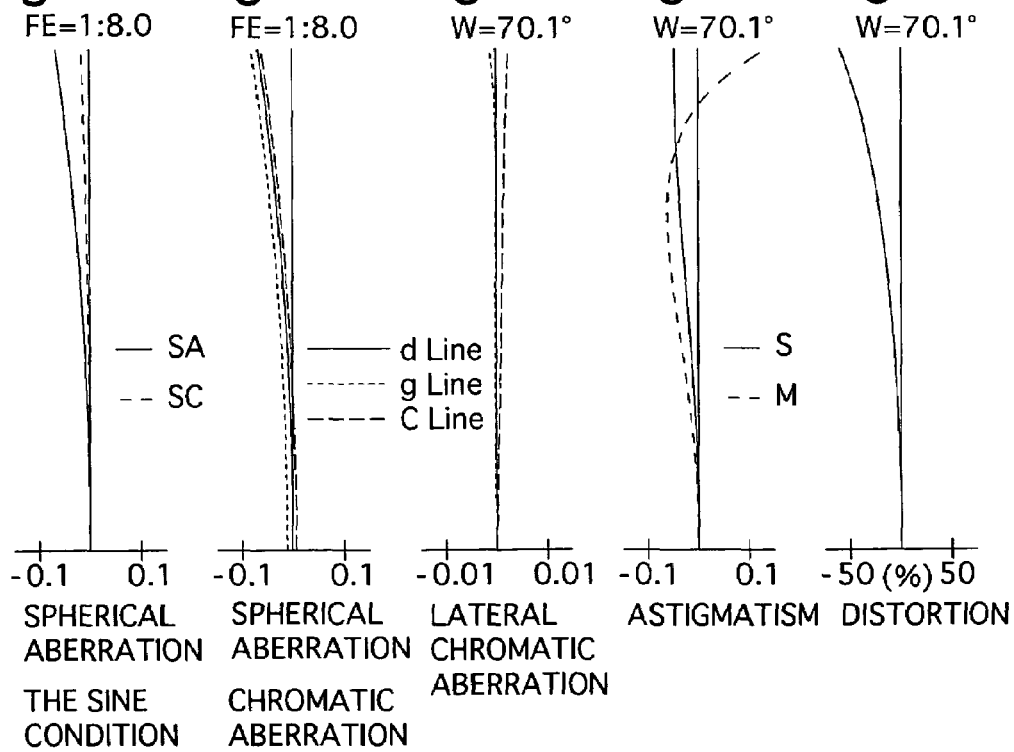
FIGS. 4A, 4B, 4C, 4D and 4E show aberrations occurred in the lens arrangement shown in FIG. 3.

FIG. 3 is the lens arrangement of the endoscope objective lens system according to the second embodiment of the present invention. FIGS. 4 through 4E show aberrations occurred in the lens arrangement shown in FIG. 3. Table 2 shows the numerical data of the second embodiment.

The basic lens arrangement of the second embodiment is the same as that of the first embodiment.

The diaphragm S is provided 0.000 mm behind the negative front lens group 10 (surface No. 4).

TABLE 2

FE = 1:8.0
f = 1.20
m = −0.116
W = 70.1
fB = 0.05

| Surf. No. | r | d | Nd | ν |
|---|---|---|---|---|
| 1 | ∞ | 0.402 | 1.88300 | 40.8 |
| 2 | 0.748 | 0.180 | — | — |
| 3 | 2.265 | 0.640 | 1.92286 | 18.9 |
| 4 | ∞ | 0.063 | — | — |
| 5 | −3.107 | 0.745 | 1.77250 | 49.6 |
| 6 | −0.856 | 0.300 | — | — |
| 7 | −8.485 | 0.250 | 1.92286 | 18.9 |
| 8 | 2.631 | 0.073 | — | — |
| 9 | 4.662 | 1.060 | 1.77250 | 49.6 |
| 10 | −1.862 | 1.123 | — | — |
| 11 | ∞ | 0.500 | 1.51633 | 64.1 |
| 12 | ∞ | 0.300 | — | — |
| 13 | ∞ | 0.300 | 1.53113 | 62.4 |
| 14 | ∞ | — | — | — |

Embodiment 3

FIG. 5 is the lens arrangement of the endoscope objective lens system according to the third embodiment of the present invention. FIGS. 6A through 6E show aberrations occurred in the lens arrangement shown in FIG. 5. Table 3 shows the numerical data of the third embodiment.

The basic lens arrangement of the third embodiment is the same as that of the first embodiment.

The diaphragm S is provided 0.000 mm behind the negative front lens group 10 (surface No. 4).

TABLE 3

FE = 1:8.2
f = 1.20
m = −0.116
W = 70.9
fB = 0.05

| Surf. No. | r | d | Nd | ν |
|---|---|---|---|---|
| 1 | ∞ | 0.394 | 1.88300 | 40.8 |
| 2 | 0.932 | 0.190 | — | — |
| 3 | 2.677 | 0.730 | 1.92286 | 18.9 |
| 4 | ∞ | 0.050 | — | — |
| 5 | −1.614 | 0.716 | 1.77250 | 49.6 |
| 6 | −0.880 | 0.220 | — | — |
| 7 | −8.207 | 0.240 | 1.92286 | 18.9 |
| 8 | 3.290 | 0.040 | — | — |
| 9 | 4.507 | 0.930 | 1.72916 | 54.7 |
| 10 | −1.624 | 0.500 | — | — |
| 11 | ∞ | 1.000 | 1.51633 | 64.1 |
| 12 | ∞ | 0.842 | — | — |
| 13 | ∞ | 0.300 | 1.53113 | 62.4 |
| 14 | ∞ | — | — | — |

Embodiment 4

FIG. 7 is the lens arrangement of the endoscope objective lens system according to the fourth embodiment of the present invention. FIGS. 8A through 8E show aberrations occurred in the lens arrangement shown in FIG. 7. Table 4 shows the numerical data of the fourth embodiment.

The basic lens arrangement of the fourth embodiment is the same as that of the first embodiment.

The diaphragm S is provided 0.000 behind the negative front lens group 10 (surface No. 4).

TABLE 4

FE = 1:8.2
f = 1.20
m = −0.116
W = 70.1
fB = 0.05

| Surf. No. | r | d | Nd | ν |
|---|---|---|---|---|
| 1 | ∞ | 0.400 | 1.88300 | 40.8 |
| 2 | 0.785 | 0.180 | — | — |
| 3 | 5.869 | 0.780 | 1.92286 | 18.9 |
| 4 | ∞ | 0.130 | — | — |
| 5 | −5.301 | 0.575 | 1.77250 | 49.6 |
| 6 | −0.900 | 0.350 | — | — |
| 7 | −8.918 | 0.245 | 1.92286 | 18.9 |
| 8 | 2.464 | 0.090 | — | — |
| 9 | 4.138 | 0.805 | 1.77250 | 49.6 |
| 10 | −1.850 | 1.441 | — | — |
| 11 | ∞ | 0.500 | 1.51633 | 64.1 |
| 12 | ∞ | 0.300 | — | — |
| 13 | ∞ | 0.300 | 1.53113 | 62.4 |
| 14 | ∞ | — | — | — |

Embodiment 5

Figure 9:
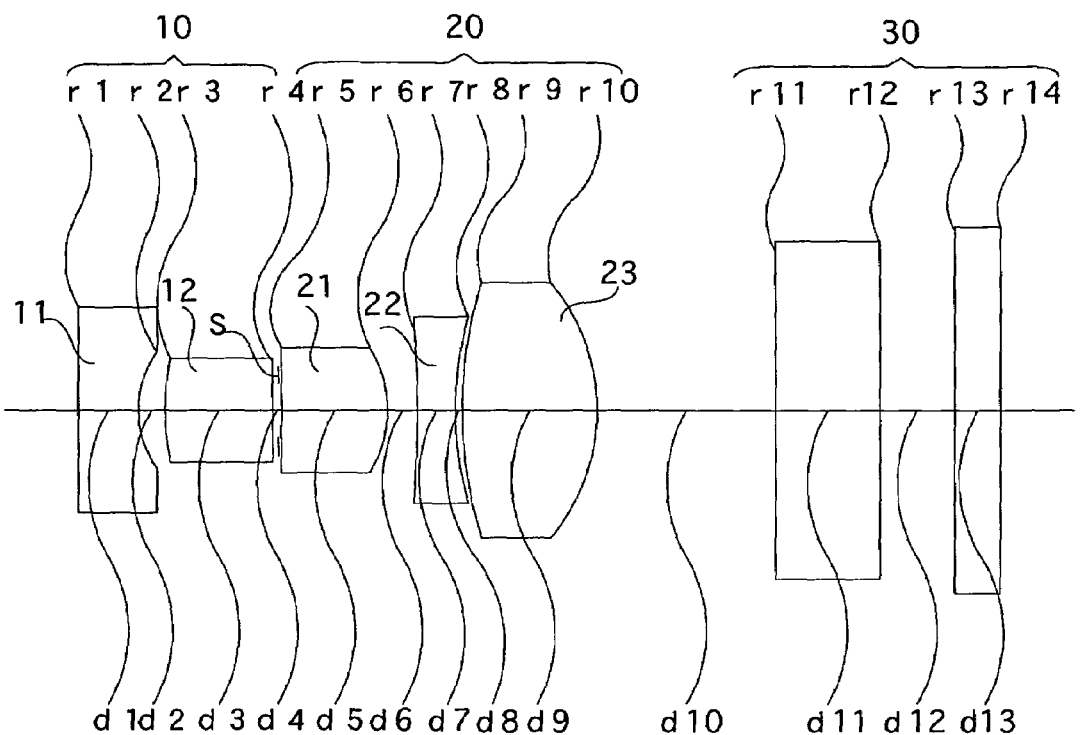
FIG. 9 is a lens arrangement of the endoscope objective lens system according to a fifth embodiment of the present invention.
Figures 10A, 10B, 10C, 10D, 10E:
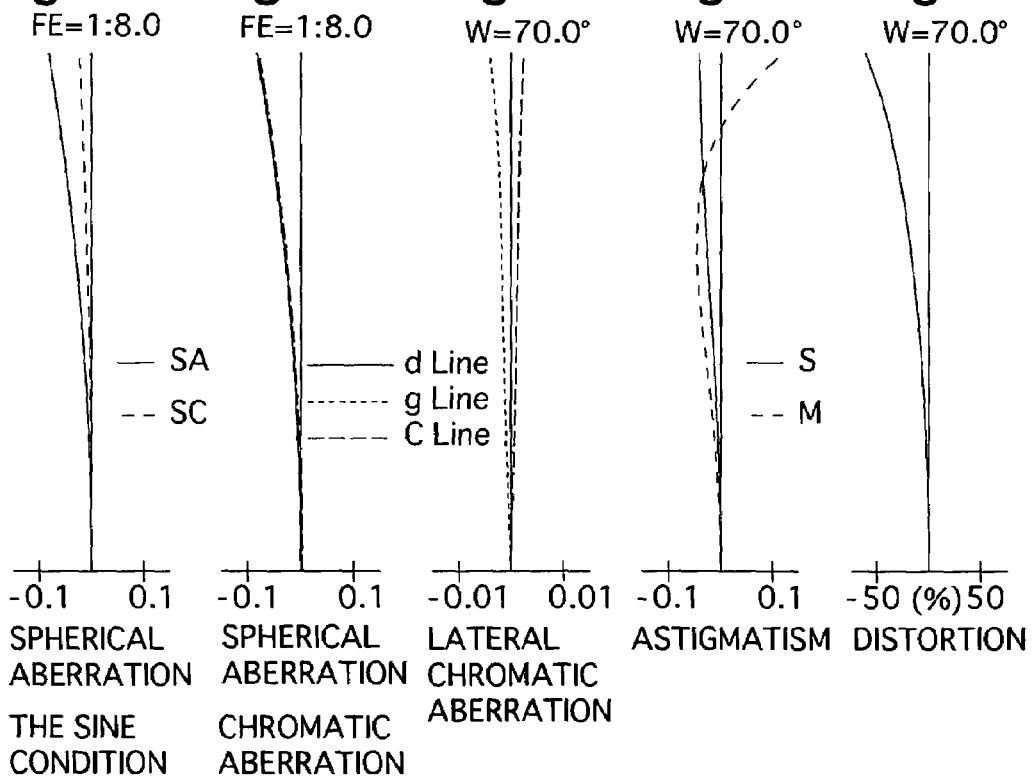
FIGS. 10A, 10B, 10C, 10D and 10E show aberrations occurred in the lens arrangement shown in FIG. 9.

FIG. 9 is the lens arrangement of the endoscope objective lens system according to the fifth embodiment of the present invention. FIGS. 10A through 10E show aberrations occurred in the lens arrangement shown in FIG. 9. Table 5 shows the numerical data of the fifth embodiment.

The basic lens arrangement of the fifth embodiment is the same as that of the first embodiment.

The diaphragm S is provided 0.000 behind the negative front lens group 10 (surface No. 4).

TABLE 5

FE = 1:8.0
f = 1.20
m = −0.116
W = 70.0
fB = 0.05

| Surf. No. | r | d | Nd | ν |
|---|---|---|---|---|
| 1 | ∞ | 0.400 | 1.88300 | 40.8 |
| 2 | 0.686 | 0.180 | — | — |
| 3 | 1.674 | 0.715 | 1.84666 | 23.8 |
| 4 | ∞ | 0.060 | — | — |
| 5 | −2.036 | 0.700 | 1.69680 | 55.5 |
| 6 | −0.831 | 0.200 | — | — |
| 7 | −7.679 | 0.255 | 1.84666 | 23.8 |
| 8 | 2.347 | 0.045 | — | — |
| 9 | 2.955 | 0.900 | 1.60300 | 65.5 |
| 10 | −1.371 | 1.197 | — | — |
| 11 | ∞ | 0.700 | 1.51633 | 64.1 |
| 12 | ∞ | 0.500 | — | — |
| 13 | ∞ | 0.300 | 1.53113 | 62.4 |
| 14 | ∞ | — | — | — |

Embodiment 6

Figure 11:
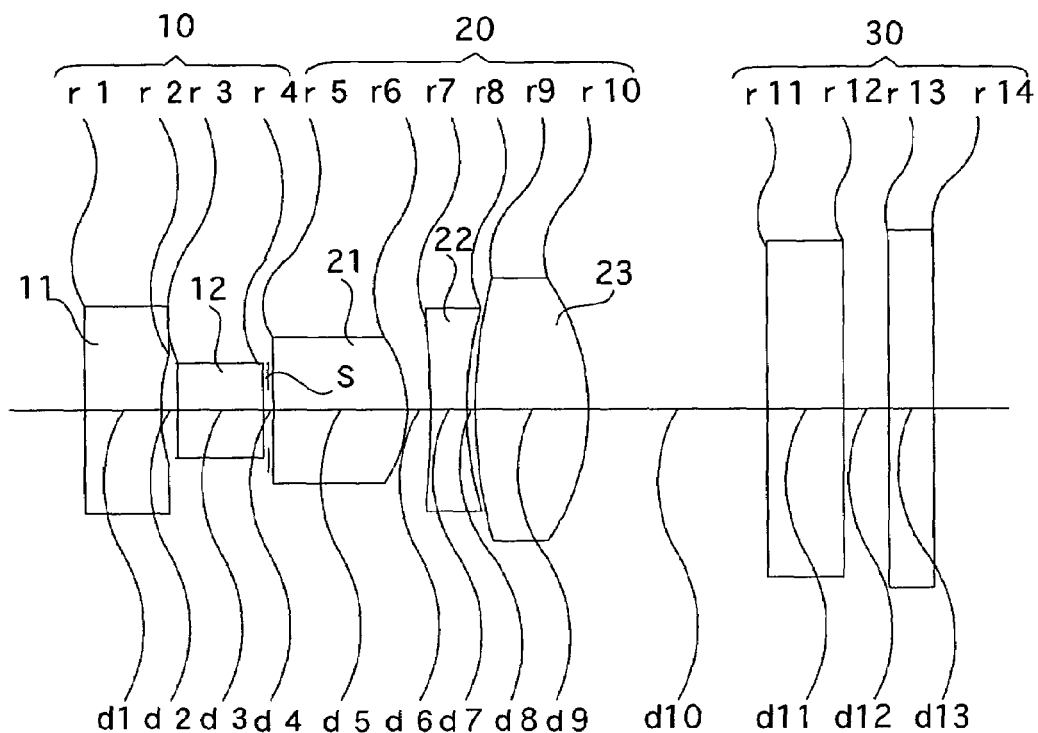
FIG. 11 is a lens arrangement of the endoscope objective lens system according to a sixth embodiment of the present invention.
Figures 12A, 12B, 12C, 12D, 12E:
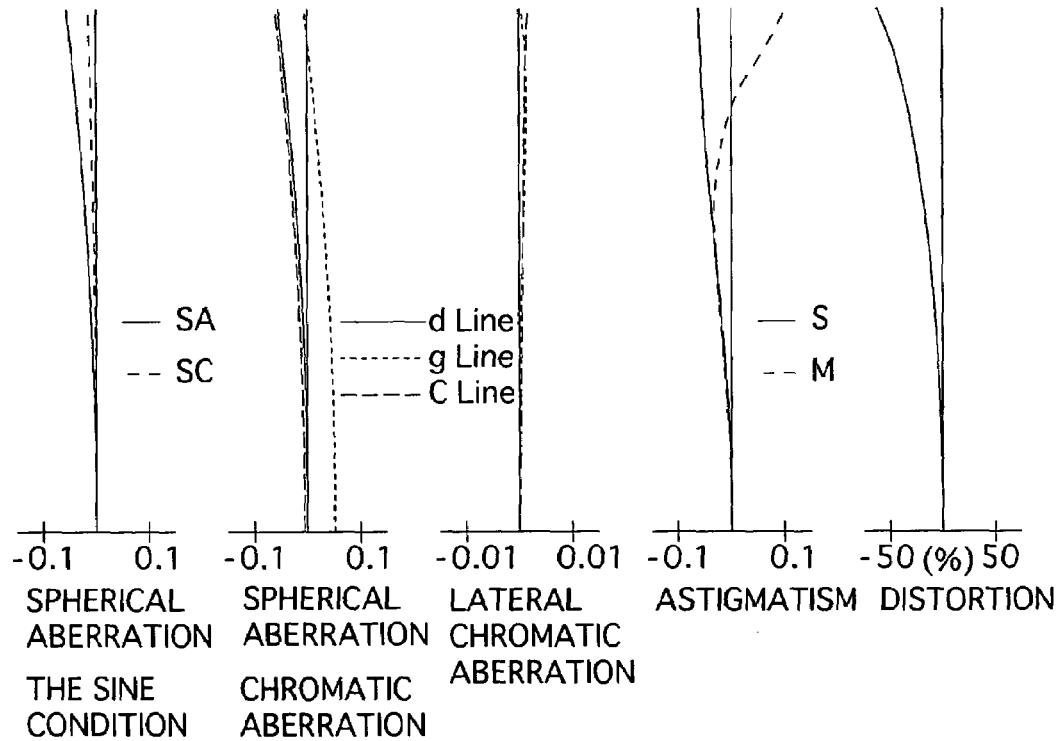
FIGS. 12A, 12B, 12C, 12D and 12E show aberrations occurred in the lens arrangement shown in FIG. 11.

FIG. 11 is the lens arrangement of the endoscope objective lens system according to the sixth embodiment of the present invention. FIGS. 12A through 12E show aberrations occurred in the lens arrangement shown in FIG. 11. Table 6 shows the numerical data of the sixth embodiment.

The negative front lens group 10 includes the negative lens element 11 and the plane-parallel plate 12, in this order from the object.

The remaining basic lens arrangement of the sixth embodiment is the same as that of the first embodiment.

The diaphragm S is provided 0.000 behind the negative front lens group 10 (surface No. 4).

TABLE 6

FE = 1:8.2
f = 1.20
m = −0.115
W = 69.9
fB = 0.05

| Surf. No. | r | d | Nd | ν |
|---|---|---|---|---|
| 1 | ∞ | 0.505 | 1.88300 | 40.8 |
| 2 | 1.442 | 0.110 | — | — |
| 3 | ∞ | 0.580 | 1.92286 | 18.9 |
| 4 | ∞ | 0.055 | — | — |
| 5 | −2.956 | 0.880 | 1.77250 | 49.6 |
| 6 | −0.883 | 0.157 | — | — |
| 7 | −5.947 | 0.235 | 1.92286 | 18.9 |
| 8 | 2.516 | 0.054 | — | — |
| 9 | 3.359 | 0.753 | 1.72916 | 54.7 |
| 10 | −1.565 | 1.179 | — | — |
| 11 | ∞ | 0.500 | 1.51633 | 64.1 |
| 12 | ∞ | 0.300 | — | — |
| 13 | ∞ | 0.300 | 1.53113 | 62.4 |
| 14 | ∞ | — | — | — |

Embodiment 7

Figure 13:
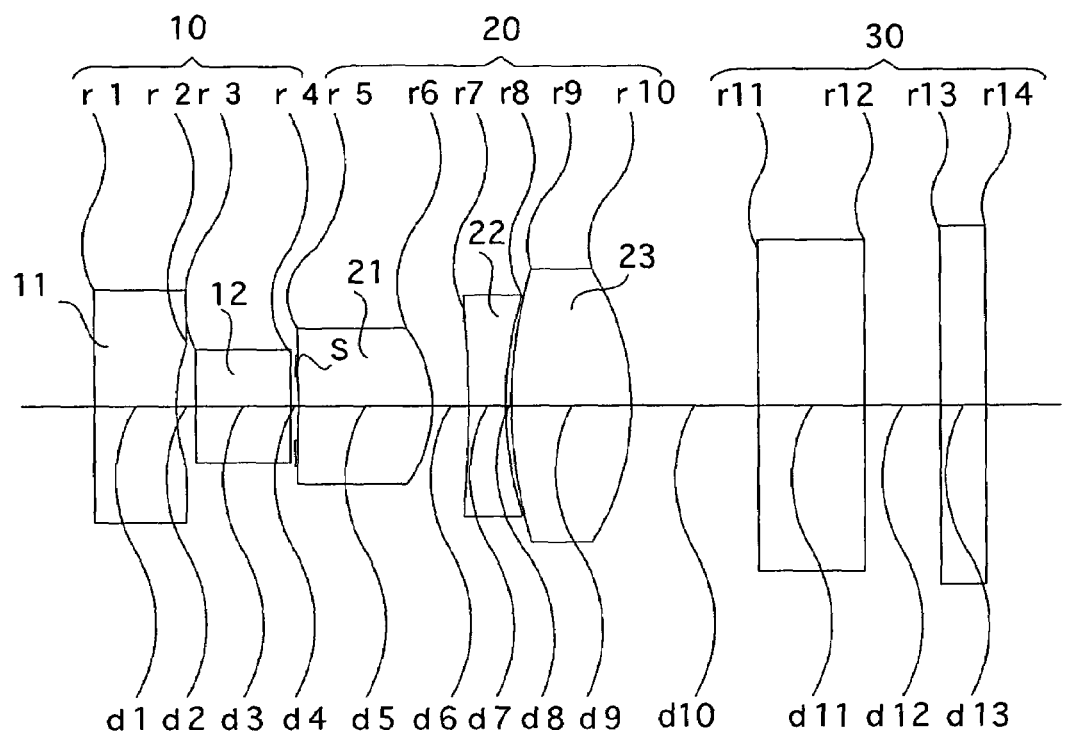
FIG. 13 is a lens arrangement of the endoscope objective lens system according to a seventh embodiment of the present invention.
Figures 14A, 14B, 14C, 14D, 14E:
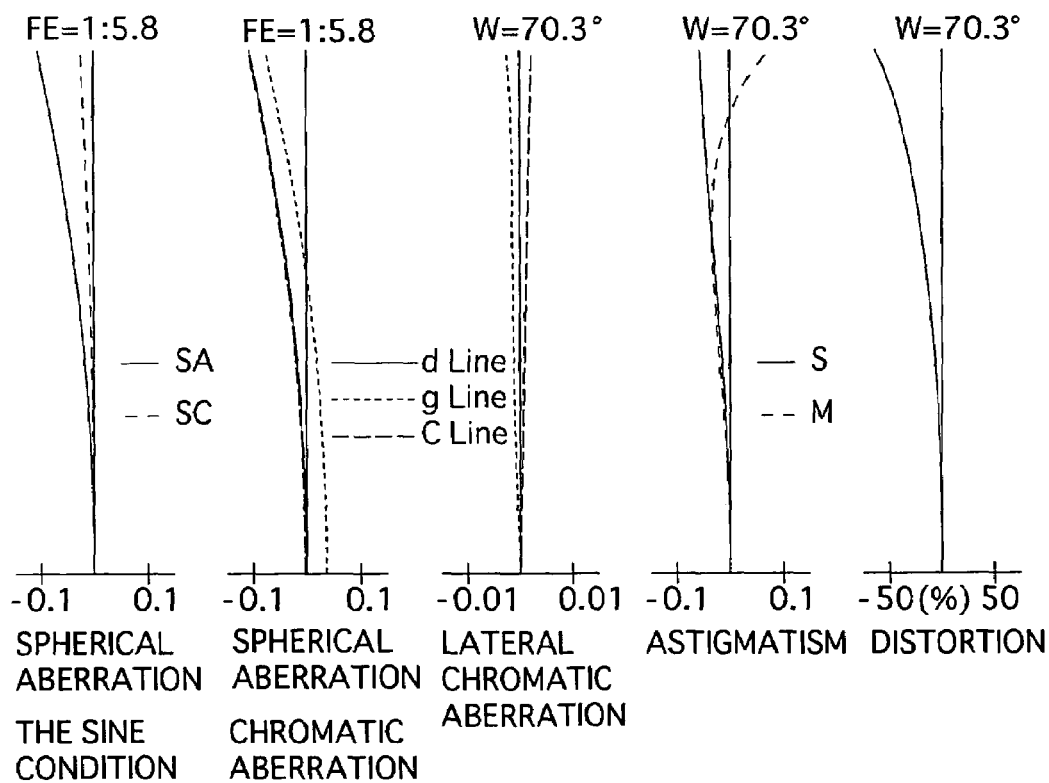
FIGS. 14A, 14B, 14C, 14D and 14E show aberrations occurred in the lens arrangement shown in FIG. 13.

FIG. 13 is the lens arrangement of the endoscope objective lens system according to the seventh embodiment of the present invention. FIGS. 14A through 14E show aberrations occurred in the lens arrangement shown in FIG. 13. Table 7 shows the numerical data of the seventh embodiment.

The basic lens arrangement of the seventh embodiment is the same as that of the sixth embodiment.

The diaphragm S is provided 0.000 behind the negative front lens group 10 (surface No. 4).

TABLE 7

FE = 1:5.8
f = 1.20
m = −0.115
W = 70.3
fB = 0.05

| Surf. No. | r | d | Nd | ν |
|---|---|---|---|---|
| 1 | ∞ | 0.540 | 1.88300 | 40.8 |
| 2 | 1.360 | 0.125 | — | — |
| 3 | ∞ | 0.625 | 1.84666 | 23.8 |
| 4 | ∞ | 0.055 | — | — |
| 5 | −2.795 | 0.870 | 1.80400 | 46.6 |
| 6 | −0.922 | 0.235 | — | — |
| 7 | −7.467 | 0.250 | 1.92286 | 18.9 |
| 8 | 2.629 | 0.035 | — | — |
| 9 | 3.193 | 0.800 | 1.72916 | 54.7 |
| 10 | −1.716 | 0.844 | — | — |
| 11 | ∞ | 0.700 | 1.51633 | 64.1 |
| 12 | ∞ | 0.500 | — | — |
| 13 | ∞ | 0.300 | 1.53113 | 62.4 |
| 14 | ∞ | — | — | — |

Embodiment 8

FIG. 15 is the lens arrangement of the endoscope objective lens system according to the eighth embodiment of the present invention. FIGS. 16A through 16E show aberrations occurred in the lens arrangement shown in FIG. 15. Table 8 shows the numerical data of the eighth embodiment.

The negative front lens group 10 includes a single negative lens element 11.

The remaining basic lens arrangement of the eighth embodiment is the same as that of the first embodiment.

The diaphragm S is provided 0.160 behind the negative front lens group 10 (surface No. 4).

TABLE 8

FE = 1:6.9
f = 1.20
m = −0.116
W = 69.8
fB = 0.05

| Surf. No. | r | d | Nd | ν |
|---|---|---|---|---|
| 1 | ∞ | 0.600 | 1.74100 | 52.7 |
| 2 | 1.121 | 0.220 | — | — |
| 3 | −1.790 | 0.820 | 1.72916 | 54.7 |
| 4 | −0.732 | 0.220 | — | — |
| 5 | −7.876 | 0.230 | 1.92286 | 18.9 |
| 6 | 2.541 | 0.046 | — | — |
| 7 | 3.384 | 0.765 | 1.72916 | 54.7 |
| 8 | −1.537 | 0.260 | — | — |
| 9 | ∞ | 0.600 | 1.51633 | 64.1 |
| 10 | ∞ | 0.952 | — | — |
| 11 | ∞ | 0.360 | 1.53113 | 62.4 |
| 12 | ∞ | — | — | — |

The numerical values of each condition for each embodiment are shown in Table 9.

TABLE 9

|  | Embod. 1 | Embod. 2 | Embod. 3 | Embod. 4 |
|---|---|---|---|---|
| Cond. (1) | −0.726 | −0.706 | −0.880 | −0.740 |
| Cond. (2) | 0.912 | 1.012 | 1.296 | 0.757 |
| Cond. (3) | −1.982 | −1.795 | −2.100 | −1.724 |
| Cond. (4) | 1.923 | 1.923 | 1.923 | 1.923 |
| Cond. (5) | 2.389 | 2.194 | 2.742 | 2.051 |
| Cond. (6) | 2.316 | 2.047 | 2.417 | 5.294 |

|  | Embod. 5 | Embod. 6 | Embod. 7 | Embod. 8 |
|---|---|---|---|---|
| Cond. (1) | −0.649 | −1.363 | −1.281 | −1.262 |
| Cond. (2) | 1.022 | 1.264 | 1.166 | 1.286 |
| Cond. (3) | −1.753 | −1.577 | −1.732 | −1.719 |
| Cond. (4) | 1.847 | 1.923 | 1.923 | 1.923 |
| Cond. (5) | 1.961 | 2.100 | 2.187 | 2.120 |
| Cond. (6) | 1.652 | — | — | — |

As can be understood from Table 9, the first through fifth embodiments satisfy conditions (1) through (6), and the sixth through eighth embodiments satisfy conditions (1) through (5). Furthermore, as can be understood from the aberration diagrams, the various aberrations are adequately corrected.

According to the present invention, an endoscope objective lens system which has the following features in order to meet higher pixelation of an imaging device can be attained:

(i) no cemented lens elements are provided;
(ii) the angle of view is approximately 140 degrees;
(iii) aberrations is suitably corrected without utilizing aspherical surfaces;
(iv) a longer back focal distance is secured; and
(v) telecentricity is improved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A fixed focal length endoscope objective lens system comprising a negative front lens group, a diaphragm, and a positive rear lens group, in this order from an object;

wherein said negative front lens group comprises one lens element, or a plurality of non-cemented lens elements;

wherein the most object-side lens element of said negative front lens group is a negative lens element;

wherein said positive rear lens group comprises a plurality of non-cemented lens elements;

wherein at least one negative lens element is provided in said positive rear lens group;

wherein said endoscope objective lens system satisfies the following conditions:

$-1.45 < f_1/f < -0.6$ $0.7 < |f_F/f_R| < 1.35$ $-2.3 < f_{(-)}/f < -1.5$ wherein $f_1$ designates the focal length of the most object-side negative lens element of said negative front lens group;

f designates the focal length of the entire endoscope objective lens system;

$f_F$ designates the focal length of said negative front lens group with ($f_F < 0$);

$f_R$ designates the focal length of said positive rear lens group with ($f_R > 0$); and $f_{(-)}$ designates the focal length of said negative lens element of said positive rear lens group.

2. The endoscope objective lens system according to claim 1, wherein said negative lens element of said positive rear lens group satisfies the following condition:

$1.8 < n_{(-)}$ wherein $n_{(-)}$ designates the refractive index of said negative lens element of said positive rear lens group.

3. The endoscope objective lens system according to claim 1, wherein said positive rear lens group comprises two positive lens elements and one negative lens element.

4. The endoscope objective lens system according to claim 1, wherein said positive lens element, said negative lens element and said positive lens element are arranged in this order from the object.

5. The endoscope objective lens system according to claim 3, wherein said negative lens element of said positive rear lens group satisfies the following condition:

$1.95 < |R_{(-)}|/f < 3$ wherein $R_{(-)}$ designates a smaller radius of curvature of one of the surfaces of said negative lens element.

6. The endoscope objective lens system according to claim 1, wherein said negative front lens group comprises a negative lens element and a positive lens element, in this order from the object;

wherein the image-side surface of said positive lens element is formed in a flat surface; and wherein said positive lens element satisfies the following condition:

$$1.6 < f_2/f < 7$$

wherein f2 designates the focal length of said positive lens element of said negative front lens group.

7. The endoscope objective lens system according to claim 1, wherein said negative front lens group comprises a negative lens element and a plane-parallel plate, in this order from the object.

8. The endoscope objective lens system according to claim 1, wherein said negative front lens group comprises a single negative lens element.

* * * * *